United States Patent [19]

Hosoya

[11] Patent Number: 4,973,064
[45] Date of Patent: Nov. 27, 1990

[54] MAGNETIC FLUID SEAL DEVICE

[75] Inventor: Masachi Hosoya, Kanagawa, Japan

[73] Assignee: Nippon Seiko Kabushiki Kaisha, Tokyo, Japan

[21] Appl. No.: 343,857

[22] Filed: Apr. 26, 1989

[51] Int. Cl.$^5$ .............................................. F16J 15/40
[52] U.S. Cl. ...................................... 277/80; 277/135
[58] Field of Search .................................. 277/80, 135

[56] References Cited

U.S. PATENT DOCUMENTS

| 4,171,818 | 10/1979 | Moskewitz et al. | 277/80 |
| 4,357,021 | 11/1982 | Raj et al. | 277/80 |
| 4,444,398 | 4/1984 | Black, Jr. et al. | 277/80 |

FOREIGN PATENT DOCUMENTS

| 76053 | 6/1985 | Japan . | |
| 0155065 | 8/1985 | Japan | 277/80 |
| 3579 | 4/1987 | Japan . | |
| 1122851 | 11/1984 | U.S.S.R. | 277/80 |

Primary Examiner—William A. Cuchlinski, Jr.
Assistant Examiner—Daniel G. DePumpo
Attorney, Agent, or Firm—Morrison Law Firm

[57] ABSTRACT

A magnetic fluid seal device, which comprises a seal member constituting of two ring-shaped pole pieces attached to the poles of a permanent magnet, a rotor disposed with a gap for the seal member in between, and magnetic fluid magnetically kept in the aforementioned gap. The magnetic fluid is magnetically maintained through a groove defined by the inside faces of the two ring pole pieces and the peripheral surface of the ring magnet, and the distance of the groove on one side of the two ring pole pieces keeping the magnetic fluiid is made smaller than the thickness of the ring magnet at a place on its other side not keeping the magnetic fluid, thus ensuring the magnetic fluid to be injected into the two gaps and the device to be effectually sealed by the two-stage closely adjacent fluid seals formed.

5 Claims, 3 Drawing Sheets

MAGNETIC FLUID SEAL DEVICE

BACKGROUND OF THE INVENTION

1. Field of the Invention

This invention relates to a magnetic fluid seal device which seals bearings and other mechanical rotating portions by magnetic fluid.

2. Description of the Prior Art

FIGS. 3 and 4 are this kind of seal device according to the prior art which are used in the magnetic disc device.

In the drawings, Numeral 1 is a cylindrical housing, and Numeral 2 is a shaft fixed to the housing 1 through bearings 3. "C" is a ring seal member consisting of a ring magnet 6 and ring pole pieces 4, 5 coaxially fixed to the end surfaces thereon. A gap "g" is provided in between the pole pieces 4, 5 and the inner race 3a in the bearing 3. The seal member is fixed by bond to the inner peripheral face of the outer race 3b in the bearing 3. The inner race 3a is fixed to the shaft 2, and the outer race 3b to the housing 1. The inner race 3a and the pole pieces 4, 5 are of magnetic material. Numeral 7 is magnetic fluid kept by magnetic force in the above-mentioned gap "g", or kept by a magnetic force generated by a magnet 6 in between the inner race 3a and the seal member C. Numerals 8, 9, 10 11 and 12 are respectively a disc inserted onto the shaft 2, a magnetic head, balls, a ball retainer and a seal plate.

Since the device is of such construction as described above, the gap between the seal member C and the inner race 3a is sealed with the magnetic fluid 7 kept in the gap, thus preventing dust (grease dust) generated from the bearing from entering the clean zone.

With prior art, however, as shown in FIG. 5, a wide range of ring-shaped groove m defined by the inner side faces 4a, 5a and the inner peripheral face 6a of the magnet 6 is formed at the peripheral portion of the seal member facing the inner race 3a bounded by the magnetic fluid 7. As a result, when magnetic fluid 7 is being injected from one gap "g" at one pole piece 4 using an injector 13, the magnetic fluid would be sometimes filled only in the gap (single sealed), but not in the other gap for the other side of pole piece 5 (not double sealed).

The reason for the single sealing (as the result of the failure of the desired double sealing) may be as follows:

(1) The magnetic fluid 7 is strongly absorbed to the first corner 4m at the side of pole piece 4 and the second corner 5m at the other side of pole piece 5, thus resulting in the stuck fluid which would not be readily moved by the injection pressure.

(2) The width W of the above-mentioned groove m is made narrower by a thinner magnet 6, but an excessively thin magnet would weaken the holding force of the magnetic fluid 7, thereby resulting in a limited thickness of the magnet thick enough to obtain the holding force. Therefore, the width W is made substantially wide, resulting in a long travel distance of the magnetic fluid 7, leading to a substantially high injection pressure required to move the magnetic fluid 7 from the first corner 4m to the second corner 5m.

In this connection, magnetic fluid 7 must be injected from a gap "g" at one side of pole piece 4, because, with the prior art shown in FIGS. 3 and 4, the fluid cannot be injected from the other gap "g" at the other side of pole piece 5.

There has been available another magnetic fluid seal device according to the prior art as disclosed in the Japanese Laid-Open Patent No. 76053/1985 (FIG. 6).

The following is the description of the device in FIG. 6:

The rotating shafdt 2x is made of non-magnetic material. Across the ring permanent magnet 6x, two ring pole pieces 4x, 5x are attached. And, the ends of the ring pole pieces 4x, 5x are inwardly bent facing each other remaining a gap "g" at the peripheral face of the above-mentioned rotating shaft 2x, and also remaining a gap "gx" between the two facing bent portions. This construction intends not only to form a magnetic field acting between the two facing bent tips along the axial direction of the rotating shaft 2x, but also to seal the gap "g" between the two ring pole pieces 4x, 5x and the rotating shaft 2x to keep a desired amount of magnetic fluid 7 within the magnetic field.

With this seal device, however, since the rotating shaft 2x is made of a non-magnetic material, no magnetic field is formed between the rotating shaft 2 and the ring pole pieces 4x, 5x, but a magnetic field is formed only along the small gap "gx" between the facing bent tips of the ring pole pieces 4x, 5x, to keep magnetic fluid. But the keeping of the fluid is performed only at one place around the rotating shaft. Therefore, there may not be any problem in injecting magnetic fluid 7x, but the so-called one stage sealing may not have an adquate seal effect.

As preceding examples according to the prior art as shown in FIG. 6, there have been known the followings: Australia Patent No. 267656, Japan Laid-Open Patent Nos. 166567/1987, 57761/1980 and 146956/1982, Japan Laid-Open Utility Model No. 106575/1978, Japan Patent Publication NO. 13420/1964, England Patent Nos. 1575145, 1292338 and Soviet Patent No. 742657, and the article "Magnetic Fluid Seal" in the magazine "Machine Design" (March 26, 1968) at page 146.

FIG. 7 shows another preceding example according to the prior art shown in FIG. 8 in the Japan Utility Model Publication No. 3579/1987.

The preceding example according to the prior art shown in FIG. 7 is similar to the construction of the prior art shown in FIG. 6 in which the rotating shaft 2x is made of non-magnetic material, but is different from that in that the rotating shaft 2y is made of magnetic material. Therefore, two-stage (duplicated) seal is formed also in the gaps "gap" between the shaft 2y and respective side faces of the bent extensions at the ends of the two ring pole pieces across the ring permanent magnet.

However, when magnetic fluid 7y is injected using an injector like FIG. 5 into one side of gap "gap" between one pole piece 4y or 5y and the rotating shaft, since the fluid cannot directly reach the other side of gap "g", the fluid would move to the other side of gap through the inside of the one gap, the internal peripheral surface of the magnet 6y, and the inside of the other side of pole piece. Therefore, a substantially great amount of magnetic fluid is required in the groove "my" defined by the both pole pieces 4y, 5y and the magnet 6y, thus resulting in an unstable operation.

SUMMARY OF THE INVENTION

To solve these problems as described above, a magnetic seal device according to the invention comprises:

A seal member consisting of two ring-shaped pole pieces fixed to the end surfaces of an coaxially polarized ring magnet:

a rotating body of magnetic material making a coaxial and relative rotation to the above-mentioned seal member with gaps spaced from the ends of the above-mentioned two pole pieces; and magnetic fluid kept by a magnetic force generated by the magnet in the above-mentioned gap; wherein at least at one part of a peripheral portion of the seal member facing the rotating body existing with the above-mentioned magnetic fluid, a ring-shaped groove defined by each inside face of the ends of the two ring pole pieces and the inner peripheral surface of the ring magnet is provided, and further the maximum distance between the inside faces of the two pole pieces constituting at least a part of the above-mentioned groove is made smaller than the thickness of every part of the ring magnet apart from the abovementioned groove.

And another magnet seal device according to the invention comprises:

a ring magnet constituting a seal member facing a rotating body at right angles; and two ring pole pieces magnetically stuck onto magnetic poles formed at end surfaces of the above-mentioned ring magnet;

wherein both of the above-mentioned ring magnet and pole pieces form a slant narrow section at the ends near the rotating body;

the ends of the above-mentioned two ring pole pieces are faced to the rotating body at right angles; and a groove is defined by inside faces of the two ring pole pieces and peripheral surface of the ring magnet; and a distance between inside faces of the two ring pole pieces constituting the above-mentioned groove is made smaller than a thickness of main part of the magnet apart from the above-mentioned slant narrow section.

And further a magnetic seal device according to the invention comprises:

a ring magnet constituting a seal member facing a rotating body; and two ring pole pieces magnetically stuck onto magnetic poles formed at end surfaces of the above-mentioned ring magnet;

wherein both of the above-mentioned ring magnet and pole pieces form a slant narrow section at the ends near the rotation body;

the ends of the above-mentioned two ring pole pieces are faced on the slant to the rotating body; and a groove is defined by inside faces of the two ring pole pieces and peripheral surface of the ring magnet; and a maximum distance between inside faces of the two ring pole pieces constituting the above-mentioned groove is made smaller than a thickness of main part of the magnet apart from the above-mentioned slant narrow section.

DESCRIPTION OF THE PREFERRED EMBODIMENTS

Figure 1:
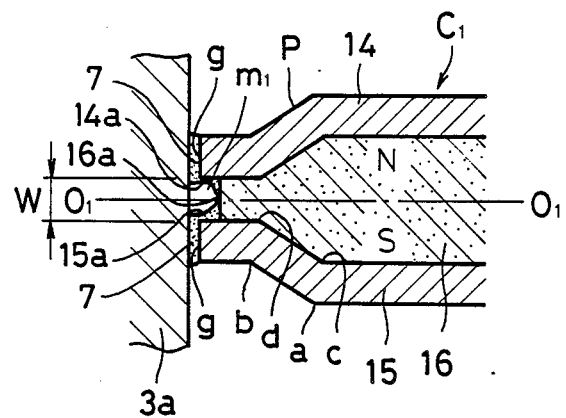
FIG. 1 is a sectional view showing major parts of an embodiment according to the invention.
Figure 3:
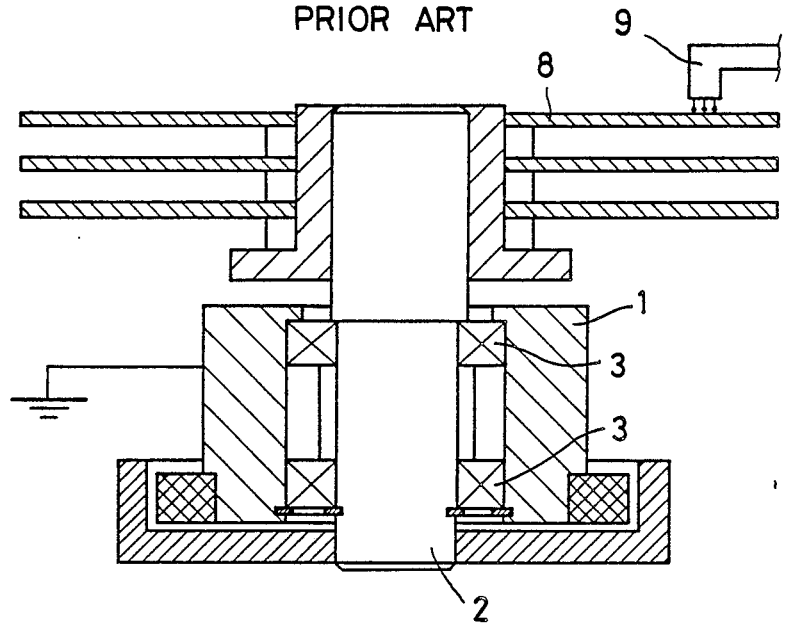
FIG. 3 shows a magnetic disc device using a magnetic fluid seal device according to the prior art.
Figure 4:
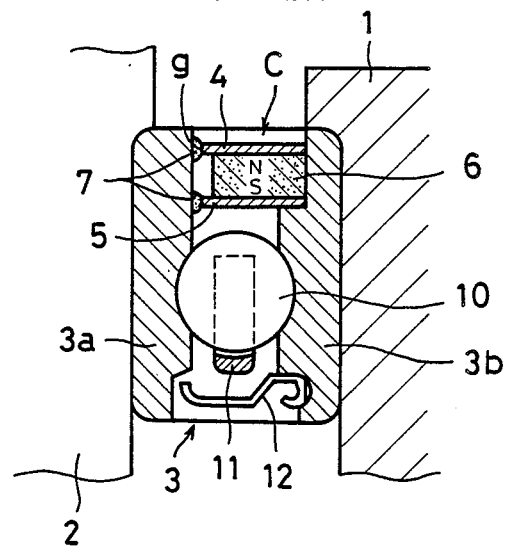
FIG. 4 is an enlarged view showing major parts in FIG. 3.
Figure 5:
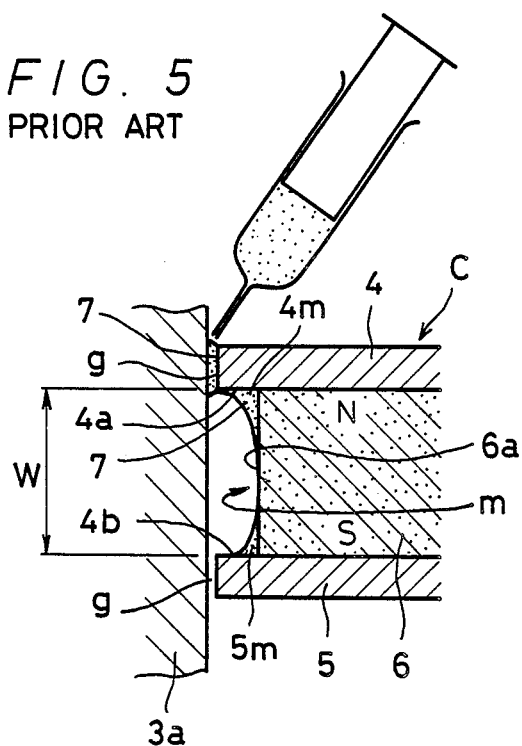
FIG. 5 is an enlarged view showing major parts in FIG. 4.
Figure 6:
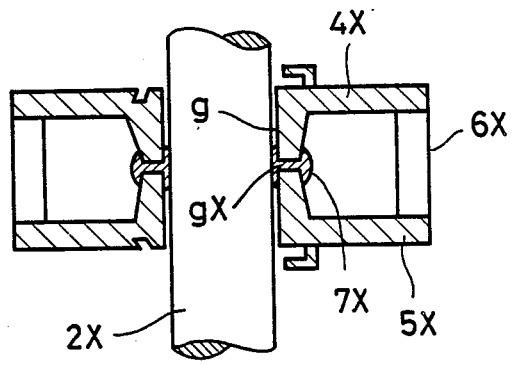
FIG. 6 is a sectional view showing another magnetic fluid seal device according to the prior art.
Figure 7:
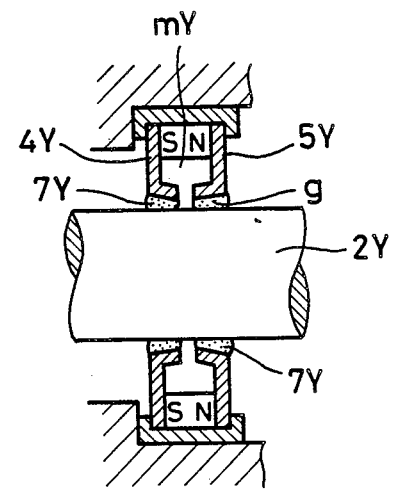
FIG. 7 is a sectional view showing a further separate magnetic fluid seal device according to the prior art.

FIG. 1 shows an embodiment according to the invention adapted for the magnetic disc device in FIG. 3. FIG. 1 corresponds to FIG. 5 for the prior art, and the corresponding parts to the ones in FIGS. 5, 3, and 4 are respectively attached with the same Numerals.

The embodiment is a magnetic fluid seal device having a ring-shaped groove m, at the peripheral portion of a seal member $C_1$ facing an inner race (rotating body) 3a through magnetic fluid 7 which is defined by the inner side faces 14a, 15a of two ring pole pieces 14, 15 and a peripheral surface 16a of a ring magnet 16. The width W of the groove $m_1$ (exactly, a distance between the inside faces 14a, 15a of the two pole pieces 14, 15) is made smaller than the thickness of the ring magnet 16 body at a place sufficiently apart from the groove $m_1$.

To reduce the width W of the groove $m_1$, the thickness of the ring magnet 16 may be made uniformly thinner to be set to the width W, but the uniformly thinner magnet 16 cannot have a magnetic force enough to hold magnetic fluid 7. Therefore, to have a sufficiently thick magnet body, the magnet 16 is made thinner only at the inner peripheral portion of the seal member $C_1$ near the inner race 3a.

In other words, the ring pole pieces 14, 15 respectively are bent at two places "a", "b", and the magnet 16 is made thinner from a point "c" to a point "d" to make a slant by narrowed section P of the seal member $C_1$ near the rotating body or the inner race 3a. The end faces of the two ring pole pices 14, 15 face the inner race (rotating body) 3a at right angles, and a gap "g" between the end faces and the inner race 3a is set to a uniform width at all places.

As a result, since the pole pieces 14, 15 have been fixed along both side of the magnet 16, the seal member $C_1$ is made thinner at the inner peripheral portion. In this connection, the ring groove $m_1$ may be provided along the whole or part of periphery of the seal member $C_1$.

The description of the operation is as follows:

Since the width W of the groove $m_1$ is sufficiently narrow through the slant narrow portion P of the seal member $C_1$, the moving distance of the magnetic fluid 7 injected into the gap "g" at one side of pole piece 14 is short at the bottom (the thinner part of the inner periphery of the magnet (16) of the groove $m_1$. Therefore, the short distance allows the magnetic fluid 7 to be readily double sealed. More particularly, a normal injection pressure can ensure the magnetic fluid 7 to be injected into the both gaps "g".

Figure 2:
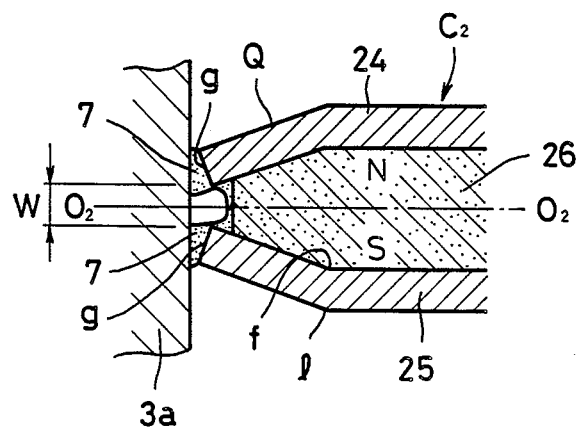
FIG. 2 is a sectional view showing major parts of another embodiment according to the invention.

Next, another embodiment according to the invention is described referring to FIG. 2:

With the seal member $C_2$ in the embodiment, the ring pole pieces 24, 25 respectively are slantly bent at one place "1", and the magnet 26 is slantly narrowed to the rotating body 3a from one place "f" of inner side of the seal member $C_2$ near the rotating body 3a, the two ring pole pieces 24, 25 and the magnet 26 form the tip ends of a slant narrowed portion Q. Therefore, the gap "g" of the end faces of the pole pieces 24, 25 to the inner race 3a is not uniform but wider at the side of the magnet 26. The operation effect is essentially the same as that of the embodiment in FIG. 1.

In this connection, the shape of the pole pieces 14, 15 and 24, 25 at the portion nearer to the inner race 3a (not shown) may be widened to keep amuch more amount of magnetic fluid 7, and to have a larger contact area with the fluid 7.

Furthermore, the slanted narrow portion P or Q is symmetric about axis $0_1$—$0_1$, or $0_2$—$0_2$, but the portion may be asymmetric, or futher not linear as indicated in the drawing but curved.

The above description is made about the embodiments in which this invention is adapted for magnetic disc devices having a rotating shaft 2 installed with disc 800 thereon. But this invention can be adapted for a magnetic disc device in which a housing installed with disc thereon rotates about a shaft. In this case, the rotating body in the above description is the housing.

As described above, because the invention provides a narrow groove defined by a slant narrow portion of two ring pole pieces along with a thinner part of a ring magnet at the peripheral portion of the seal member facing a rotating body through magnetic fluid, the magnetic fluid can be readily injected into the two gaps defined by the pole pieces and the rotating body, thus ensuring a double construction of seal effect.

I claim:
1. An improved Magnetic Fluid Seal Device for providing a dynamic seal with a rotating body of magnetic material of the type, including:
   a seal-member consisting of two ring-shaped pole pieces and an axially polarized ring magnet disposed therebetween; said seal-member being coaxial with said rotating body, with said pole pieces spaced apart from said rotating member to provide gaps therebetween; said pole pieces extending radially inwardly of said magnet and defining therewith an annular groove in said seal member; and
   magnetic fluid retained in said gaps between said pole pieces and said rotating body of magnetic force generated by said magnet; wherein the improvement comprises:
   a portion of at least one of said pole pieces is slanted toward the other of said pole pieces such that the mouth of said groove is smaller than the thickness of said magnet at a point remote from said groove; and
   said magnet includes a tapered inner portion such that the width of the magnet surface defining the base of said groove is less than the thickness of said magnet at a point remote from said groove.

2. The improved magnetic fluid seal device of claim 1, wherein each of said pole pieces terminates in an annular portion at right angles to said rotating member.

3. An improved magnetic fluid seal device for providing a dynamic seal with a rotating body of magnetic material comprising:
   an axially polarized, toroidal magnet coaxial with said rotating body, said magnet having a radially inwardly convergent portion and an inner face opposite to said rotating body;
   a ring-shaped pole piece magnetically attached to each axial end of said magnet, said pole pieces conforming to the axial configuration of said magnet and extending radially inwardly beyond said magnet inner face and terminating in spaced relation to said rotating body to define gaps therebetween; and
   magnetic fluid retained in said gaps of magnetic forces generated by said magnet.

4. The improved magnetic fluid seal device of claim 3, wherein the inner distal portions of said pole pieces converge.

5. The improved magnetic fluid seal of claim 3, wherein the inner distal portions of said pole pieces are at right angles to said rotating body.

* * * * *